Figure 1:
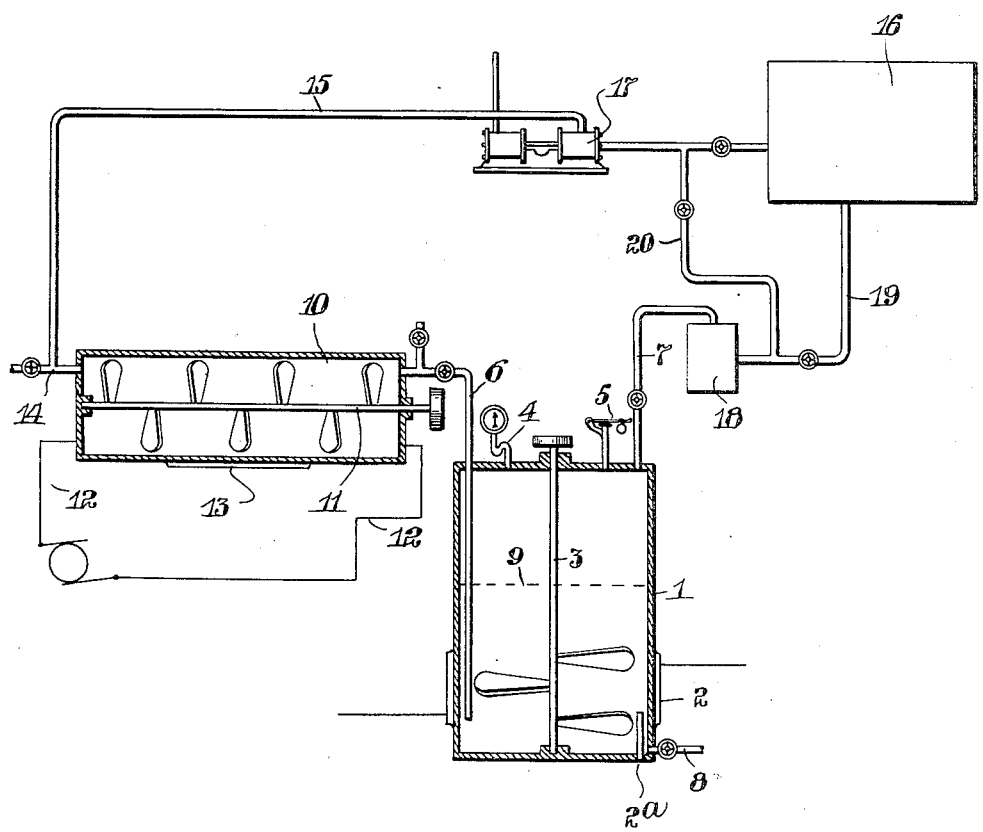
Figure 2:
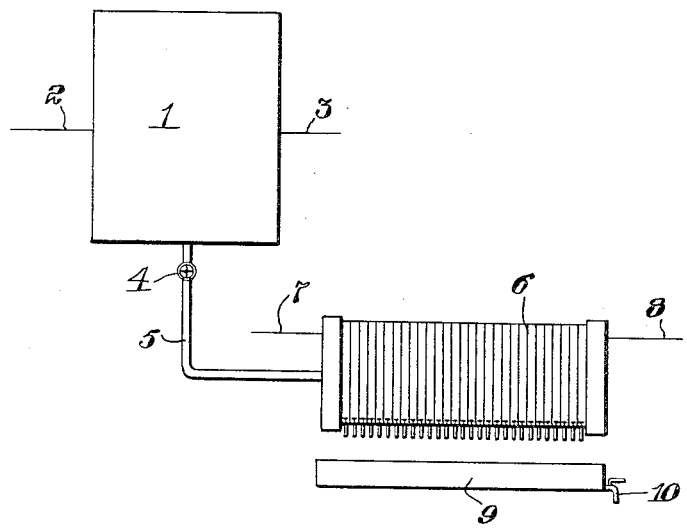

C. ELLIS.
CATALYZER CONCENTRATE AND PROCESS OF MAKING SAME.
APPLICATION FILED FEB. 6, 1914.

1,251,202.

Patented Dec. 25, 1917.

2 SHEETS—SHEET 1.

Attest:

Inventor:
Carleton Ellis

C. ELLIS.
CATALYZER CONCENTRATE AND PROCESS OF MAKING SAME.
APPLICATION FILED FEB. 6, 1914.

1,251,202.

Patented Dec. 25, 1917.

UNITED STATES PATENT OFFICE.

CARLETON ELLIS, OF MONTCLAIR, NEW JERSEY.

CATALYZER-CONCENTRATE AND PROCESS OF MAKING SAME.

1,251,202.     Specification of Letters Patent.     Patented Dec. 25, 1917.

Application filed February 6, 1914. Serial No. 817,041.

*To all whom it may concern:*

Be it known that I, CARLETON ELLIS, a citizen of the United States, and a resident of Montclair, in the county of Essex and State of New Jersey, have invented certain new and useful Catalyzer-Concentrates and Processes of Making Same, of which the following is a specification.

This invention relates to catalyzers and to the process of making same and relates particularly to catalyzers prepared by heat decomposition, or by other similar procedures and embraces as raw materials the organic compounds of the metals including nickel compoupnds such, for example, as nickel carbonyl.

The action of carbon monoxid on nickel was noted by Mond and his associates in 1890. When carbon monoxid is passed over finely-divided nickel at a temperature of 50° or so, nickel carbonyl is obtained and may be condensed to a liquid which mixes readily with many fatty oils and may be decomposed by heating in oil to a temperature of between 100° to 200° C. When the carbonyl decomposes carbon monoxid is liberated and nickel or nickel material is liberated, apparently in the elemental condition throughout the oil in a finely divided condition and if liberated under certain conditions the nickel is in such a state of extreme sub-division that it remains suspended in the oil indefinitely, rendering the oily material inky black in color. This catalytic material is so active that simply by bubbling a slow stream of hydrogen through a fatty oil such as cottonseed oil contained in an open test tube and heated to about 180° C., it affords in a very short time a fat of great hardness.

To prepare a catalyzer from nickel carbonyl it may be introduced into the oil as described in my co-pending applications Serial Nos. 68,814 and 692,903 of which this application is a continuation in part.

For example, as stated in Serial No. 688,814, filed April 5, 1912, (now Patent 1,154,495, issued September 21, 1915), nickel carbonyl is readily soluble in many oily bodies and in using the catalyzer produced according to the present invention, this nickel compound to the extent of 1% or 2% or so, based on the weight of the oil employed, may be mixed with oil and hydrogen gas contacted with the mixture or solution, while at the same time the temperature of the oil is brought to the point of decomposition of the nickel carbonyl. The nickel is thus separated and at least for a time, forms an extremely effective catalytic body and quickly causes hydrogen to enter the oil molecule for this purpose ordinarily, it is useful to heat the oil to a temperature of about 200° C. to accomplish such decomposition. Nickel carbonyl usually is not as easily decomposed when diluted as when heated in the pure state. Hence the temperature employed should be determined by the speed of decomposition of the nickel carbonyl under the circumstances; that is to say, both the character of the oil and the degree of dilution as well as pressure and other conditions, should be considered.

Another modification of the present invention is that of mixing the requisite amount of nickel carbonyl with hydrogen gas, or water gas, or other gas suitable for the purpose and then passing this mixture into the oil to be treated. The oil is brought to the decomposition temperature of the nickel carbonyl under these circumstances and thus the metallic nickel catalyzer is liberated in intimate contact with the hydrogen gas, thereby effecting the rapid hydrogenation of the oil. The oil may contain, if desired, finely-divided solid material to serve as an attaching base to which the nickel can attach itself as it is set free from its compounds.

Another modification involves heating the oil to 180° C. or so, and atomizing such oil with a mixture of hydrogen gas and nickel carbonyl. Or the nickel carbonyl may be added to the oil and the oil then atomized with hydrogen gas, the temperature being regulated for the production of the active material as above indicated. After such atomization, the oil may be passed through a heated tube or over a bed of heated fragmental material. Also, the oil may be mixed with a small amount of nickel carbonyl and caused to flow downwardly through a tower containing baffles while hydrogen gas or other gas is allowed to flow upwardly against the downwardly flowing stream of oil. The tower may be heated at one or more points so as to secure a temperature sufficient to decompose the nickel carbonyl and then, if desired, the temperature may be modified so that the mixture, on flowing through another portion of the tower is subjected to a temperature better adapted for the hydrogenation process proper. The same operation may be conducted in an inclined tube such an apparatus being shown and described in Serial No. 656,100, filed October 23, 1911, which has matured into Letters Patent No. 1,026,156, May 14, 1912, using means for differentially heating said tube. This application contains subject matter disclosed in the file of aforesaid Letters Patent and also as stated of my co-pending application Serial No. 686,988, filed March 29, 1912, as regards the thermal decomposition of metallo-organic compounds and the like to produce active material for catalytic purposes, which material may be produced in a state of almost infinite sub-division, perhaps molecular.

When carrying on the operation as a continuous process and using water gas for hydrogenation, the residual gas, depleted of its hydrogen in a large measure, may be used for preparing the nickel carbonyl.

Nickel carbonyl may also be employed in a different way, in that it may be mixed with asbestos or fullers' earth, or other similar carrier and heated to form a catalytic material without resorting to direct reduction of say nickel oxid, by hydrogen. Such a catalytic body may then be used for treating oils in the presence of hydrogen under suitable conditions of temperature and pressure.

Various oils may be treated in accordance with the present invention, the unsaturated fatty acids being treated, if desired, in the form of their vapors under diminished pressure. Fatty esters, such as corn and cottonseed oil, soya bean oil, fish oil, almond oil, peanut and mustard oils, castor oil, linseed and Chinese wood oils and the like are better treated in their liquid form, or sometimes in an atomized condition. As stated it is desirable to regulate the temperature of decomposition of the nickel compound according to the particular condition of treatment, varying this according to the oil employed and the pressure of the hydrogen gas. In some cases, as indicated, it is desirable to decompose the potential catalyzer at a somewhat higher temperature than that needed for completion of the hydrogenation.

In addition to nickel carbonyl, other volatile bodies having under certain conditions potentially catalytic properties, including the corresponding compounds of iron and the like, and some of the compounds of metals with hydrocarbons, such for example, as the methyl compounds of the metals, as zinc methyl and the like may be employed.

A preferred method of decomposing nickel carbonyl is to mix it with a small quantity of oil and heat in a closed chamber to about 180° C., although decomposition takes place at a lower temperature. An inky black product is obtained and this may be added to a large quantity of oil to introduce perhaps $\frac{1}{4}$ to $\frac{1}{2}$ of 1% of nickel when hydrogenation takes place readily on suitable contact with hydrogen.

In making nickel carbonyl one may take ordinary nickel oxid or specially prepared nickel compounds of various kinds and reduce in a current of hydrogen at 300°–500° C., more or less. A long rotary drum or cylinder may be used for this purpose, or a stationary cylinder fitted with stirring paddles. The hydrogen is admitted at one end and removed at the other along with the steam formed. The cylinder may be electrically heated as by a resistance or induction effect, or simply by passing the electric current through the entire apparatus. Water gas, producer gas, coke oven gas, natural gas and the like as well as vapors such as those of gasolene, alcohol and benzene, etc., may be used for reducing purposes. If higher temperatures are used than those above mentioned, the pressure may be correspondingly higher. When reduction is completed, a current of carbon monoxid or water gas is passed over the nickel mass which for ordinary pressure should be kept at a temperature of about 40° or 50° C., during this part of the process. Nickel carbonyl is formed and may be collected as a liquid, or it may be passed directly to a mass of oil heated to a temperature sufficient to decompose the carbonyl. Such an apparatus may be a closed cylindrical vessel set upright and equipped with stirrers partly filled with oil and arranged to be heated to 180° C. or so. Electrically heating elements may be inserted in the oil to secure the requisite temperature.

The nickel carbonyl may be run directly from the chamber in which it is made into the heated oil without resorting to preliminary condensation. The oil is agitated and the nickel is precipitated in the oil in a finely-divided condition. Carbon monoxid is liberated and this may be passed through a washing apparatus and, if desired, into a gasometer and then pumped back to the nickel carbonyl producing apparatus. Thus the carbon monoxid may travel through the circuit in combination with nickel part of the time and part of the time as a free gas. Instead of washing the carbon monoxid as it comes from the decomposer, if it contains sufficient amounts of nickel carbonyl which have escaped decomposition, it may be passed through a heated tube to break down the nickel carbonyl, or the gas may be caused to pass through a second decomposer, or the gas may be sent directly back to the nickel carbonyl producing apparatus, etc.

When considerable quantities of nickel carbonyl are heated with oil in a closed vessel the pressure rises gradually due to carbon monoxid being liberated and consequently care should be taken that no excessive pressure is developed in the apparatus because of this.

The apparatus for treating the reduced nickel or other nickel material with carbon monoxid may be a horizontal or vertical cylinder equipped with a stirring apparatus. The stirrer is not always necessary, but is desirable in order to get underlying masses better exposed to the gas.

The accompanying drawings show in diagrammatic fashion an illustrative form of apparatus which may be used in carrying out the present invention. In the annexed drawing I have shown partly in elevation and partly in section, the several parts of the apparatus necessary for carrying out the purposes of the present invention.

In said drawing, 1 is a heating tank or decomposer which is equipped with a heating means 2 which may be a steam jacket or an electrical heating element or equivalent device. Similar electrical heating elements may be inserted into the oil as shown at 2ª to increase the heating effect, or these elements may be used without the heating jacket 2. These electrical heating elements are particularly suitable for heating oil for hydrogenating purposes and the resistance type is more satisfactory than the induction system. The elements used as resistance material may be iron or nickel and chromium wire or granular poorly conducting material such as charcoal, graphite, etc. The decomposer is fitted with a stirrer 3, pressure gage 4, safety valve 5, inlet pipe 6, outlet pipe 7, and draw-off 8. The inlet pipe 6 extends beneath the level of the oil 9, while the outlet pipe 7 leads from the upper part of the decomposer. 10 is a nickel carbonyl generator and consists of a horizontal tank or cylinder which also if desired may be placed upright to form a tower and which has the stirrer 11. This apparatus is electrically heated by preference, for which purpose electrical connections as shown at 12, may be provided. A cooling jacket may be used as shown at 13, although this generally is not necessary. Carbon monoxid, or mixtures of hydrogen and monoxid may be admitted by the pipe 14. When using liquefaction methods for the production of hydrogen from water gas, carbon monoxid is obtained as a by-product and is ordinarily used for operating compression engines. In the present case the carbon monoxid may be used as required for the production of nickel carbonyl and the gas may be readily obtained under any desired pressure and also at any desired low temperature, so that the cold gas may be admitted to the reaction chamber in which the nickel carbonyl is being made and any exothermic heating effect which is prejudicial to the operation may be compensated for by the cooling effect of the entering cold current of carbon monoxid. 15 is a pipe leading to the gasometer 16; interposed in this pipe line is the pump 17. The outlet pipe 7 from the decomposer 1 connects with the washer 18 and from the washer a pipe 19 leads to the gasometer 16. A by-pass 20 enables the gasometer to be thrown out of the circuit when desired.

The operation of the foregoing apparatus to prepare the product of the present invention is carried out illustratively as follows:

Nickel oxid is reduced in the chamber 10 by passing over it hydrogen gas or other reducing gas at a temperature of 300° or 400° C. preferably, and if desired with stirring. The nickel left is then cooled to a temperature preferably below 100° C. and carbon monoxid gas or gas rich in carbon monoxid is passed over the nickel which preferably at atmospheric pressure should not be much above 40° or 50° C. and much higher pressures may be maintained at correspondingly higher temperatures. The nickel carbonyl vapors pass into the decomposer 1 in which a body of oil is kept in motion by the stirrer 3. Cottonseed oil or other vegetable oil, or fish or any other animal or marine animal oil or mineral oil may be used for this purpose. Also other menstruums of various kinds may be used to secure the precipitation of the nickel in the form desired. The oil is kept at a temperature of 180° or 200° C. preferably, although the temperature may be varied according to the general conditions and dimensions of the apparatus, it being desirable to adjust the temperature with respect to other conditions, so that the passage of the nickel carbonyl current through the oil will largely or completely cause the decomposition of the former so that the nickel will be set free in the oil and not in the passages leading from the decomposer which might cause clogging of same. The nickel carbonyl divides in bubbles through the oil which is preferably stirred and in the presence of so viscous a medium as an oil a very desirable degree of comminution is secured and the nickel product as obtained is relatively active.

Since, in the present invention it is more particularly the object in part to prepare catalytic material, the nickel carbonyl is passed into the oil continuously or intermittently for a sufficient period until the oil is more concentrated in nickel. Thus. oil containing 5, 10, 15, 25 or 50% or so of nickel may be obtained and the oily mass carrying this metal may subsequently be added as desired to a sufficient quantity of oil in suitable treating apparatus so as to introduce one-fourth, or one-half of one per cent. or so of this catalyzer as desired and the oil hydrogenated under proper thermal conditions.

Thus a catalyzer is prepared by concentrating nickel in a body of oil and a new article of manufacture is thereby obtained, namely, finely-divided nickel precipitate obtained from an oil-soluble nickel compound by thermal decomposition in a body of oil which metal is sealed from the air by the presence of the oil, and because of the viscosity or other properties of the oily material, the nickel does not precipitate in a gross or coarse form in which it would be less active. On the other hand, it is undesirable to produce the nickel under such conditions that the oil is charged with particles of nickel which cannot be filtered very readily unless it is desired to obtain a colloidal condition and due allowance made therefor in connection with subsequent treatment.

By decomposing the nickel carbonyl in a relatively small body of oil and then mixing with a large body of oil a control over the size of grain or character of the nickel may be had to a considerable measure and this is of importance in connection with the subsequent operations of filtration. By decomposing the nickel carbonyl at different temperatures, catalyzers of different sizes of particles and hence of varying activity and filtering properties may be obtained and hence the desirability of preparing the catalyzer in a small body of oil suitable for use by subsequently transferring same to a larger body of oil.

If the oil in which the nickel carbonyl is decomposed is not one which should be added in large quantities to the oil to be hydrogenated, as for instance if a fatty oil is to be hydrogenated and the catalyzer has been prepared in a petroleum oil, the nickel in the small body of petroleum oil may be filtered to remove the oil as much as possible, or in fact the oil may be extracted by volatile solvents if desired and the nickel material then added to the oil which is to be hydrogenated.

It has been shown by Sabatier and others that nickel is more sensitive in its catalytic properties the lower the temperature at which it is formed. In a current of hydrogen little or no reduction takes place at 225° or 250° C. Reduction is not very effective below 300° or 350° C. By the preparation of nickel from nickel carbonyl the catalytic material may be obtained at temperatures between 100° and 200° C., or thus below the temperature at which oxygen compounds of nickel can be reduced advantageously, if at all. Thus by the preparation of nickel in this manner at relatively low temperatures, a form of nickel is obtained which is peculiarly active. When examined under the microscope with high power magnification, one often observes little flakes of the nickel material which are very rough and which appear to have nodules on the surface giving the effect of tissue having thicker and thinner portions more or less regularly disposed and this peculiar structure which may thus be obtained under suitable conditions of precipitation is eminently adapted for use in connection with catalytic processes such as hydrogenation.

In addition to nickel in this form, various auxiliary catalytic agents such as cerium and the oxids of cerium and also thorium and thoria, lanthanum, didymium and the oxids of these metals and also various salts of same as well as the metals, their oxids, carbids and other compounds may be used as set forth in my co-pending application Serial No. 686,988, derived from the file of Patent No. 1,026,156 of May 14, 1912, and these rare earths, catalyzers and their compounds in conjunction with nickel derived from nickel carbonyl, or separately used without the presence of nickel may be employed for the treatment of fatty oils, mineral oils and various other unsaturated organic bodies, as described and claimed in my copending application 118,750 filed Sept. 8, 1916.

The precipitation of nickel from nickel carbonyl, especially when carried out with concentrated carbonyl gives rise under suitable conditions to the formation of nickel in a flaky or filmy condition, in which form it is relatively easily filtered and I preferably produce the nickel in the form of leaves or sheets of extreme thinness rather than in the form of an extremely minute powder or particles such, for example, as is formed by passing nickel carbonyl greatly diluted with hydrogen gas through a heat zone of decomposition as, for example, a body of heated oil. The finely divided nickel material obtained in this way is sometimes in such an extreme state of subdivision that it does not filter with ease.

What I claim is:

1. In the catalytic hydrogenation of oils and other unsaturated bodies, the process of preparing an easily suspendable finely-divided catalyzer in adequate distribution in a liquid vehicle and of regulating the size of the particles thereof which comprises incorporating a metallo-organic compound containing carbon and oxygen united to a potentially active catalytic agent with a predetermined relatively small amount of a non-aqueous reaction vehicle, not inimical to the activity of hydrogenating catalysts, the amount of such metallo-organic compound being sufficient to carry a quantity of metal materially in excess of $\frac{1}{2}$%, relative to the amount of said vehicle, and in heating the mass to decompose the metallo-organic compound and liberate active catalytic material in the form of fine particles of regulatable size as a catalyzer concentrate.

2. In the catalytic hydrogenation of oils and other unsaturated bodies the process of preparing an easily suspendable finely-divided catalyzer in adequate distribution in a liquid vehicle which comprises incorporating a metallo-organic compound containing carbon and oxygen united to a potentially active catalytic agent comprising nickel, with a predetermined relatively small amount of an oily vehicle in amount capable of subseqeuently liberating, in said vehicle, a quantity of nickel materially in excess of that normally required for hydrogenation of said vehicle, and in heating the mass to decompose the metallo-organic compound and liberate active catalytic material in the form of fine particles as a catalyzer concentrate.

3. In the catalytic hydrogenation of oils and other unsaturated bodies the process of preparing an easily suspendable finely-divided catalyzer in adequate distribution in a vehicle which comprises incorparting nickel carbonyl with a predetermined relatively small amount of an oily vehicle, the amount of nickel carbonyl being such as to contain materially in exeecss of ½% of nickel, relatively to the amount of said vehicle, and in heating the mass to decompose nickel carbonyl and liberate active catalytic material in the form of fine particles as a catalyzer concentrate.

4. In the catalytic hydrogenation of oils and other unsaturated bodies the process of preparing an easily supendable finely-divided catalyzer in adequate distribution in a vehicle which comprises incorporating such an amount of a metallo-organic compound containing carbon and oxygen united to a potentially active catalytic agent with a predetermined relatively small amount of a vehicle miscible with fatty oil as will be capable of liberating a quantity of catalytic metal materially in excess of ½% relatively to the amount of said vehicle, and in decomposing the metallo-organic compound to liberate active catalytic material in the form of fine particles as a catalyzer concentrate.

5. In the catalytic hydrogenation of oils and other unsaturated bodies the process of preparing an easily suspendable finely-divided catalyzer in adequate distribution in a liquid vehicle which comprises incorporating a metallo-organic compound containing carbon and oxygen united to a potentially active catalytic agent comprising nickel, with a predetermined relatively small amount of an oil-soluble vehicle, the amount of such metallo-organic body containing an amount of nickel materially greater than ½% of the weight of the said vehicle, and in decomposing the metallo-organic compound to liberate active catalytic material in the form of fine particles as a catalyzer concentrate.

6. In the catalytic hydrogenation of oils and other unsaturated bodies the process of preparing an easily suspendable finely-divided catalyzer in adequate distribution in a vehicle which comprises incorporating such an amount of nickel carbonyl with a predetermined relatively small amount of a vehicle readily miscible with the material to be hydrogenated as to produce a material containing materially more than ½% of nickel, and in decomposing the nickel carbonyl to liberate active catalytic material in the form of fine particles as a catalyzer concentrate.

7. In the catalytic hydrogenation of oils and other unsaturated bodies the process of preparing an easily suspendable finely-divided catalyzer in adequate distribution in a liquid vehicle, which comprises incorporating a given quantity of metallo-organic compound containing carbon and oxygen united to a potentially active catalytic agent with an amount of fatty material equal to materially less than 200 times the amount of said catalytic agent, and in heating the mass to decompose the metallo-organic compound and liberate active catalytic material in the form of fine particles as a catalyzer concentrate.

8. In the catalytic hydrogenation of oils and other unsaturated bodies the process of preparing an easily suspendable finely-divided catalyzer in adequate distribution in a liquid vehicle which comprises incorporating a metallo-organic compound containing carbon and oxygen united to a potentially active catalytic agent with an amount of fatty material far less than two hundred times the amount of such catalytic agent, in decomposing the metallo-organic compound to liberate active catalytic material in the form of fine particles as a catalyzer concentrate.

9. In the process of making a catalyzer for hydrogenating oils, the step which consists in decomposing an oil-soluble compound containing a given quantity of a potentially active catalytic agent, in an amount of oil which is substantially smaller than the amount which is capable of being hydrogenated by the use of such given quantity of catalytic agent.

10. In the hydrogenation of oily material, the step of producing a catalyzer concentrate which comprises thermally decomposing in a bulk of oily vehicle, an amount of a decomposable compound of nickel containing a quantity of said metal greatly in excess of the quantity necessary for the hydrogenation of that bulk of oily vehicle, whereby a concentrate carrying a quantity of nickel is produced which quantity is capable of serving as the catalyst necessary in the hydrogenation of a much greater bulk of oily material.

11. In the production of catalyzer for hydrogenating oils, the step which comprises decomposing a metal compound containing a given quantity of a potentially active catalytic agent in an amount of an oil which is materially less than the amount of oil capable of being converted by the use of such quantity of catalytic agent.

12. A process of making a catalyst which comprises subjecting a reducible, oil-soluble compound of a catalytic metal to the reducing action of a reducing gas, while at a temperature sufficiently high to effect a reduction of such compound and while contained in an amount of oil which is materially less than the amount of oil capable of being converted by the use of such quantity of catalytic agent.

13. A process of making a catalyst which comprises subjecting a reducible, oil-soluble compound of a catalytic metal to the reducing action of a reducing gas, while at a temperature sufficiently high to effect a reduction of such compound, and while under superatmospheric pressure and while contained in an amount of oil which is materially less than the amount of oil capable of being converted by the use of such quantity of catalytic agent.

14. A process of making a catalyzer which process comprises decomposing a non-catalytic substance, containing an amount of a metal adapted to serve as a hydrogenating catalyst, while dissolved in a quantity of a liquid vehicle not inimical to the activity of hydrogenating catalysts, materially less than two hundred times the said amount of metal, by subjecting the same to the action of a reducing gas under pressure and at an elevated temperature.

15. A process which comprises producing a solution of not less than 5% of a carbonyl compound of a hydrogenating catalytic metal in an oily vehicle and reducing the said compound by treatment of the same with hydrogen.

16. A process which comprises dissolving not materially less than 5 parts of nickel carbonyl in one hundred parts of oil, and subjecting the product to treatment with hydrogen, at superatmospheric pressure and temperature.

17. A catalyzer comprising nickel of a regulated grain size, obtained by reducing nickel carbonyl dissolved in an oily material by means of hydrogen under pressure, and containing materially more than ½% of nickel in a non-settling state of fineness.

18. In the hydrogenation of oil, the step of making a catalyzer concentrate by decomposing by heat, a given quantity of nickel carbonyl in an amount of an oily vehicle which is materially smaller than the amount of oil capable of being hydrogenated by the use of the amount of nickel contained in such quantity of nickel carbonyl.

19. A catalyzer concentrate comprising a body of oily material carrying in suspension therein, in a substantially non-settling state of fineness, an amount of catalytic agent much in excess of the quantity which would ordinarily be used for the hydrogenation of the amount of oily material present.

20. The process of making a catalyzer comprising the step of decomposing a substantially non-catalytic base-metal-containing-material, while carried in a liquid vehicle, whereby a colloidal metallic catalytic material, adapted to serve as a hyrogen carrier for saturating the unsaturated components of fatty materials is produced, the amount of such base-metal-containing-material being sufficient to produce a product containing materially more than ½% of such catalytic material.

21. A process of making a catalyzer adapted for use in hydrogenation of unsaturated fatty bodies, which comprises decomposing a substantially non-catalytic metal-containing material while dissolved in a liquid oily vehicle, whereby a finely divided partly colloidal catalytic body is produced, the amount of such metal-containing material being not less than 5% of the amount of such vehicle.

22. A process of making a catalytic material suitable for use as a hydrogen carrier, which comprises reducing not less than about 5 parts of a substantially non-catalytic base-metal-containing material while dissolved in 100 parts of a liquid vehicle, by subjecting the same to heat in the presence of a reducing gas.

23. A process of making a catalyzer which comprises dissolving not less than 5% of an unstable compound of a hydrogenating catalytic metal and a carbon-containing radical in an oily vehicle, and reducing the same while in such vehicle.

24. A catalyzer concentrate made by reducing nickel from a readily reducible nickel compound dissolved in an oil or fat by means of hydrogen under pressure, and containing materially more than ½% of nickel in a substantially non-settling state of fineness.

Signed at Montclair, in the county of Essex and State of New Jersey, this 4th day of February, A. D. 1914.

CARLETON ELLIS.

Witnesses:
B. M. ELLIS,
F. CARBUTT.